US009608916B2

(12) United States Patent
Muppala et al.

(10) Patent No.: US 9,608,916 B2
(45) Date of Patent: Mar. 28, 2017

(54) COLLABORATIVE APPLICATION CLASSIFICATION

(71) Applicant: Symantec Corporation, Mountain View, CA (US)

(72) Inventors: Suresh Muppala, Santa Clara, CA (US); Andrew Mastracci, San Jose, CA (US); Shivani Deshpande, Fremont, CA (US); Shrikrishna Karandikar, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 626 days.

(21) Appl. No.: 13/794,513

(22) Filed: Mar. 11, 2013

(65) Prior Publication Data

US 2014/0258489 A1 Sep. 11, 2014

(51) Int. Cl.
*G06F 15/173* (2006.01)
*H04L 12/851* (2013.01)

(52) U.S. Cl.
CPC .............................. *H04L 47/2441* (2013.01)

(58) Field of Classification Search
CPC .................................................. H04L 47/2441
See application file for complete search history.

(56) References Cited

U.S. PATENT DOCUMENTS

| 5,983,270 | A  | * | 11/1999 | Abraham et al. ............. 709/224 |
| 6,308,148 | B1 | * | 10/2001 | Bruins et al. ................... 703/27 |
| 6,947,984 | B2 | * | 9/2005  | Schweitzer et al. .......... 709/224 |
| 2002/0073226 | A1 | * | 6/2002 | Sridhar et al. ................ 709/235 |
| 2003/0223408 | A1 | * | 12/2003 | Chen et al. .................... 370/352 |
| 2004/0114518 | A1 | * | 6/2004 | MacFaden .......... H04L 41/0816 370/230.1 |
| 2012/0079101 | A1 | * | 3/2012 | Muppala ............. H04L 47/2441 709/224 |
| 2012/0213074 | A1 | * | 8/2012 | Goldfarb ............... H04L 43/026 370/235 |
| 2013/0077491 | A1 | * | 3/2013 | Cherian .................. H04L 69/22 370/235 |

* cited by examiner

*Primary Examiner* — Umar Cheema
*Assistant Examiner* — Anthony Rotolo
(74) *Attorney, Agent, or Firm* — Baker Botts L.L.P.

(57) ABSTRACT

Herein described is a collection of traffic classifiers communicatively coupled to a classification aggregator. Traffic classifiers may use conventional techniques to classify network traffic by application name, and thereafter may construct mappings that are used to more efficiently classify future network traffic. Mappings may associate one or more characteristics of a communication flow with an application name. In a collaborative approach, these mappings are shared among the traffic classifiers by means of the classification aggregator so that one traffic classifier can leverage the intelligence (e.g., mappings) formulated by another traffic classifier.

28 Claims, 8 Drawing Sheets

| Destination IP Address | Destination Port Number | Protocol | Application Name |
|---|---|---|---|
| 66.220.144.0 | 80, 443 | TCP | Facebook |
| 216.52.242.86 | 80, 443 | TCP | LinkedIn |
| 74.125.224.72 | 80 | TCP | Google |
| 206.190.53.11 | 110 | TCP | Yahoo Mail |

Fig. 2

COLLABORATIVE APPLICATION CLASSIFICATION

FIELD OF THE INVENTION

The present invention relates to methods, devices and computer readable media for classifying a communication flow according to its application name, and more specifically relates to an infrastructure that facilitates collaboration between a collection of traffic classifiers in the classification of a communication flow.

BACKGROUND

There are various devices that can be used to classify a communication flow according to its application name. One such device is PacketShaper™ from Blue Coat Systems Inc.™ based in Sunnyvale, Calif. For example, PacketShaper™ can analyze network traffic, separate the network traffic into various communication flows, and classify each communication flow by application name. One flow might be identified as Skype™ communication, while another flow might be identified as LinkedIn™ communication. Other example application names include Facebook™, Zynga™, Twitter™, BitTorrent™, etc. A communication flow generally refers to the network traffic between a source and a destination, or more generally between any two network devices. A communication flow may be initiated by a handshake (such as the well known TCP handshake) and may conclude with another handshake. A communication flow typically involves the transfer of information between a source and destination, the information divided into many individual data packets while the information is being transferred from the source to the destination.

Classification of network traffic is useful in that it allows policies and/or rules to be applied to the classified network traffic. For instance, a company may restrict its employees from using Facebook™ on work machines, and accordingly may drop all data packets associated with communication flows classified as Facebook™ communication. As another example, a company may prioritize certain applications over other applications. For instance, Skype™ related communication might be prioritized over YouTube™ communication, due to the low latency requirements of Skype™. Thus, classification of network traffic can provide certain controls and efficiencies such as application blocking, application prioritization, etc. At the same time, the classification of network traffic is a computationally intensive operation, requiring a very large quantity of network traffic to be classified almost instantaneously.

SUMMARY OF THE INVENTION

In various embodiments, the present invention provides techniques to increase the efficiency and scalability of network traffic classification. One focus of the present invention is a collaborative approach for classifying a communication flow by application (i.e., classifying a communication flow according to its application name). In a communication network, there may be a number of traffic classifiers (e.g., PacketShapers™) configured to classify network traffic by application name. These traffic classifiers typically classify network traffic (by application name) in isolation of one another (i.e., a first traffic classifier does not share information with a second traffic classifier to assist the second traffic classifier with its classification of network traffic by application).

There are, however, inefficiencies present in such prior approaches, as traffic classifiers may unnecessarily perform analysis that another traffic classifier has already performed. Suppose a first traffic classifier classifies a first communication flow as "application X", according to a traditional classification approach. According to one embodiment of the invention, the first traffic classifier then generates a "mapping" for application X, the mapping including abstracted characteristics of the first communication flow that are sufficient to identify any given communication flow as "application X". One such set of abstracted characteristic is the destination Internet protocol (IP) address, destination port number and protocol of the classified communication flow. Example protocols include the transmission control protocol (TCP), the user datagram protocol (UDP) and the Internet protocol (IP). The mapping can be expressed in mathematical notation as follows: (destination IP address, destination port number, protocol)->application name. Thereafter, if the first traffic classifier intercepts a second flow that matches the abstracted characteristics of the first flow, the first traffic classifier can instantly classify the second flow as application X, without any further processing.

Of course, such mapping can be utilized by other traffic classifiers as well, and therein lies the increase in efficiency through collaboration between the traffic classifiers (i.e., mappings being shared between traffic classifiers). That is, if a second traffic classifier intercepts a third flow that matches the abstracted characteristics of the first flow, the second traffic classifier can instantly classify the third flow as application X (by using the mapping provided by the first traffic classifier), without any further processing.

In many cases, the abstracted characteristics (or "signature") of an application are not unique, and an application in fact can have many signatures. Herein lies another advantage of the collaborative approach. If a first traffic classifier identifies a first signature for application X, a second traffic classifier identifies a second signature for application X, and third classifier identifies a third signature for application X, all these signatures can be pooled together to better identify application X. That is, once the classification information (e.g., in the form of mappings) is collected and compiled, a traffic classifier can classify a flow as application X, if the flow matches the first, second or third signatures of application X. This example illustrates that this instant collaborative approach not only benefits from the collaboration between traffic classifiers, but also from an increased number of traffic classifiers that collaborate with one another.

One focus of the present invention is providing a framework that facilitates the collaboration between the collection of traffic classifiers. In one approach, classification information from one traffic classifier may be broadcast directly to all other traffic classifiers (i.e., in a peer-to-peer manner). Such an approach, however, may not scale well, as the number of connections between traffic classifiers increases rapidly with the number of traffic classifiers. In a preferred embodiment, traffic classifiers are interfaced with one another via a "central hub", hereinafter referred to as a classification aggregator. The classification aggregator is tasked with transferring classification information from one traffic classifier to another traffic classifier. In one embodiment, the classification aggregator stores, in a central data store, classification information generated by each traffic classifier. Individual traffic classifiers may query the classification aggregator for classification information on an as-needed basis. Additionally or alternatively, classification information may be maintained locally in a cache at each traffic classifier and the cache may be periodically refreshed with up-to-date classification information stored at the classification aggregator.

These and other embodiments of the invention are more fully described in association with the drawings below.

BRIEF DESCRIPTION OF THE DRAWINGS

The present invention is illustrated by way of example, and not limitation, in the figures of the accompanying drawings in which:

FIG. 2 depicts a table storing classification information, according to one embodiment of the invention;

DETAILED DESCRIPTION OF THE INVENTION

Figure 1:
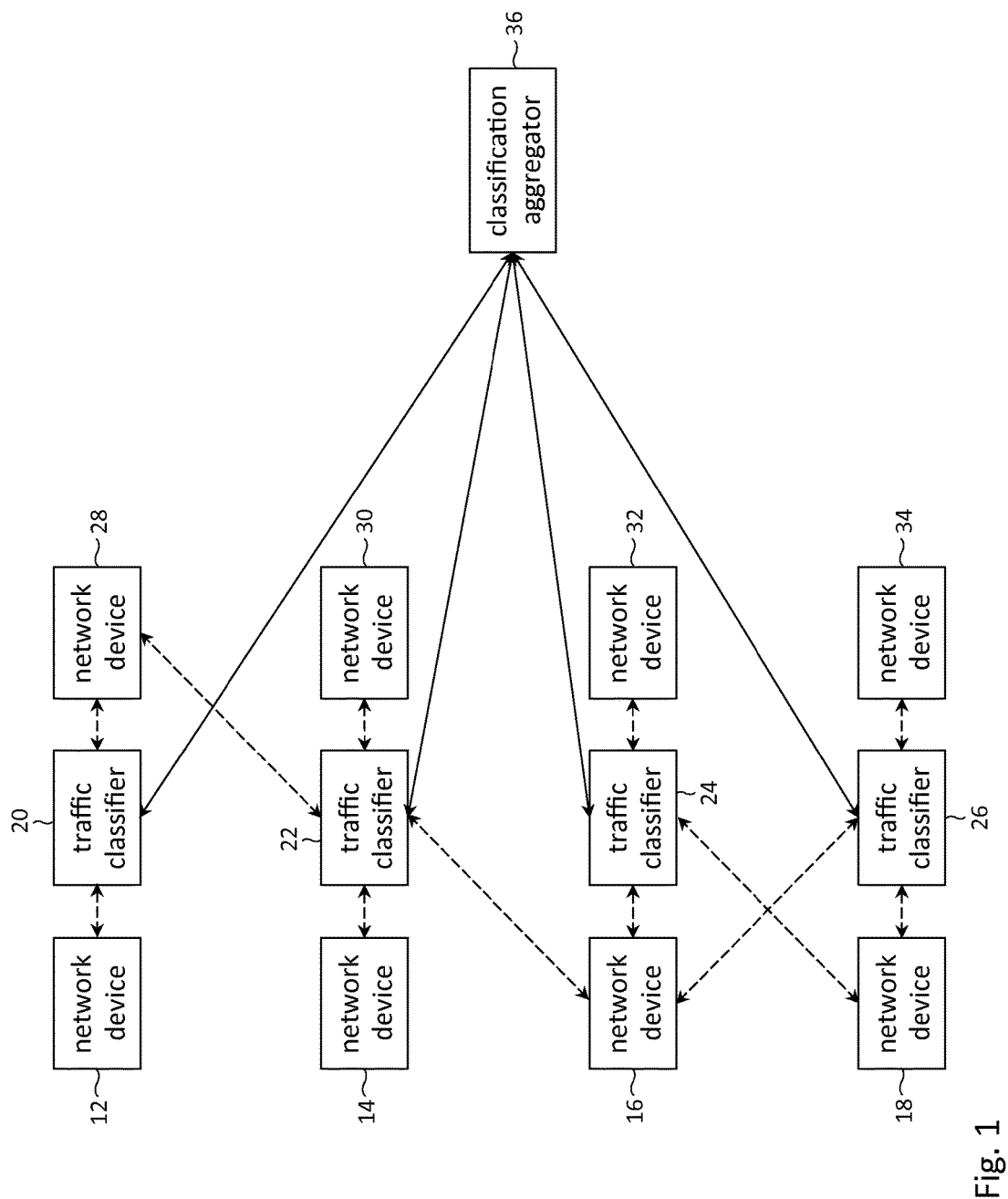
FIG. 1 depicts a system diagram with a collection of traffic classifiers communicatively coupled to a classification aggregator, according to one embodiment of the invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Where possible, like steps or similar structure are labeled with identical reference numerals for clarity.

FIG. 1 depicts a system, according to one embodiment of the invention, in which a collection of network devices (12, 14, 16, 18, 28, 30, 32 and 34) are interfaced with one another via a collection of traffic classifiers (20, 22, 24 and 26) and the collection of traffic classifiers (20, 22, 24 and 26) are in turn interfaced with one another via a classification aggregator 36. For clarity, the former connections (between network devices and traffic classifiers) are shown in dashed lines, while the latter connections (between traffic classifiers and the classification aggregator) are shown in solid lines. Traffic classifiers intercept and classify the network traffic of the network devices. For instance, traffic classifier 24 intercepts and classifies the network traffic of network devices 16, 18 and 32.

Network devices (12, 14, 16, 18, 28, 30, 32 and 34) represent any of a variety of components of a network, and may include a client, a server, a client with a browser application, a web server, a mobile device (e.g., smartphone, iPhone™, iPad™, laptop), a tethered device (e.g., desktop computer), etc. A traffic classifier may be a proxy, a firewall, a router, a gateway, a PacketShaper™, or any other device that classifies network traffic according to application name. Regardless of the specific embodiments of a network device and a traffic classifier, what is important is that a traffic classifier is able to intercept and classify the network traffic between two (or more) network devices. In the instances where a traffic classifier is implemented as a PacketShaper™, the interception is generally transparent to the network devices (i.e., the network devices are not aware that its respective communication is being monitored and classified by an intermediary device).

As previously described, the collection of traffic classifiers (20, 22, 24 and 26) are interfaced with one another via a classification aggregator 36 so that classification information may be shared between the traffic classifiers. It is contemplated that traffic classifiers may also be directly interfaced with one another, although these connections have not been depicted so as not to unnecessarily clutter the diagram.

A simplified example will now be provided to illustrate the present collaborative application classification approach. Suppose network device 16 is a Facebook™ server, and network devices (28, 30, 32 and 34) are client devices executing Facebook™ applications or browsing the Facebook™ website. When network device 16 communicates with network device 32, traffic classifier 24 may intercept and classify the communication flow according to a conventional classification process and in doing so, determine that the communication flow is associated with Facebook™. According to one embodiment of the invention, traffic classifier 24 abstracts this classification in the form of a mapping so that knowledge from this classification may readily be applied to classify other communication flows. The mapping generally associates one or more characteristics of the classified flow with the application name (in this instance Facebook™). The one or more characteristics should be a sufficient condition for the named application. That is, if any given communication flow matches the one or more characteristics, the mapping indicates that the communication flow is associated with Facebook™. A mapping generated by traffic classifier 24, for example, may be (destination IP address=66.220.144.0, destination port number=80, protocol=TCP)->Facebook. This mapping is then distributed (or otherwise made accessible) to the other traffic classifiers (20, 22 and 26) via classification aggregator 36.

Subsequently, when traffic classifier 22 intercepts a communication flow between network device 16 and network device 28, it determines the destination IP address, destination port number and protocol associated with the intercepted flow. Traffic classifier 22 may then communicate with classification aggregator 36 to determine whether any other traffic classifier has intercepted a flow with the same destination IP address, destination port number and protocol. If so, traffic classifier 22 can rely upon a previously generated mapping to identify the application name. Suppose traffic classifier 22 determines that the destination IP address=66.220.144.0, destination port number=80, and protocol=TCP. In this case, traffic classifier 22 can rely upon the mapping generated by traffic classifier 24 and conclude that the intercepted flow is also a Facebook™ communication. If no prior mapping for the identified communication flow characteristics is available, traffic classifier 22 may need to classify the intercepted flow according to conventional methods.

In one embodiment, each traffic classifier generates mappings and temporarily stores the mappings in a buffer, before periodically sending these mappings to the classification aggregator 36 in batches at predetermined time intervals (e.g., once every hour, once every day, etc.) Alternatively, each time a traffic classifier creates a new mapping, it can immediately send that mapping to classification aggregator 36. Mappings may be selectively shared with the classification aggregator. For instance, a traffic classifier may decide (for privacy reasons, etc.) that a mapping is not to be shared with the classification aggregator. More specifically, rules concerning the sharing of one or more mappings from a traffic classifier to the classification aggregator (or from the classification aggregator to a traffic classifier) may be configured by a network administrator.

In one embodiment, classification aggregator includes a database that compiles and stores the mappings provided by the traffic classifiers. FIG. 2 illustrates an exemplary table of classification mappings, with each row recording a mapping in terms of its destination IP address, destination port number, communication protocol, and application name.

Certain processing may be performed at the classification aggregator. For example, duplicate entries (e.g., duplicated mappings) may be deleted. Further, mappings may be organized in a certain fashion. For instance, all mappings that map to a common application name may be grouped together. In addition, entries that map to a common application name may be combined. For instance, the two entries (destination IP address=66.220.144.0, destination port number=80, protocol=TCP, Application Name=Facebook) and (destination IP address=66.220.144.0, destination port number=443, protocol=TCP, Application Name=Facebook) may be combined into the single entry (destination IP address=66.220.144.0, destination port number=80 & 443, protocol=TCP, Application Name=Facebook). Likewise, a range of destination IP addresses may be recorded in a mapping. Stale mappings may be deleted. For instance, a mapping that has not been utilized and/or queried by any traffic classifier over a certain time period (e.g., 1 week, 1 month, 1 year, etc.) may be deleted.

Access to the aggregated classification information (i.e., mappings) may be provided in several ways. In one embodiment, the aggregated classification information is only maintained at the classification aggregator and traffic classifiers access the aggregated classification information by submitting queries to the classification aggregator. The query may include the destination IP address, destination port number and protocol of an intercepted communication flow. The classification aggregator may search its collection of mappings to determine whether the information from the query matches any of the mappings. If there is a matching mapping, the application name specified by the matching mapping may be provided to the traffic classifier. If there is no matching mapping, the classification aggregator may notify the traffic classifier that there is no match.

In one embodiment, when a traffic classifier queries the classification aggregator for the application name of an intercepted flow, the classification aggregator, in addition to transmitting the application name, may also transmit one or more of a security risk associated with the application associated with the application name and suggested policy information for the application. More specifically, the suggested policy information may specify one or more of admission control, traffic prioritization and bandwidth allocation for the application.

In another embodiment, when a traffic classifier queries the classification aggregator for the application name of an intercepted flow, the classification aggregator, in addition to transmitting the application name, may also transmit one or more of the security risk associated with a host associated with the intercepted flow and suggested policy information for the host associated with the intercepted flow. More specifically, the suggested policy information may specify one or more of admission control, traffic prioritization and bandwidth allocation for the host associated with the intercepted flow.

In another embodiment, aggregated classification information may be maintained both at the classification aggregator and locally in a cache at each traffic classifier. Upon the cached information becoming stale, the traffic classifier may request up-to-date classification information from the classification aggregator. Alternatively, the classification aggregator may periodically push classification information to each traffic classifier without need for a request.

In one embodiment, all mappings collected by the classification aggregator are provided to each traffic classifier. In another embodiment, only selected mappings are provided to each traffic classifier. For instance, the classification aggregator may monitor the number of traffic classifiers that apply a particular mapping to classify communication flows. If a mapping is applied by a large number of traffic classifiers (e.g., number exceed a threshold), that mapping may be pushed to all traffic classifiers. In another embodiment, the classification aggregator may monitor the percentage of traffic classifiers (out of a total number of traffic classifiers interfaced with the classification aggregator) that apply a mapping. If that percentage exceeds a threshold, that mapping may be pushed to all traffic classifiers. In yet another embodiment, the classification aggregator may monitor the number of times a mapping is applied. If the number of times exceeds a threshold, that mapping may be pushed to all traffic classifiers.

In another embodiment, mappings associated with certain application classes (or only certain application classes) may be pushed to all traffic classifiers interfaced with the classification aggregator. For instance, all mappings associated with peer-to-peer applications may be pushed to all traffic classifiers interfaced with the classification aggregator.

Figure 3:
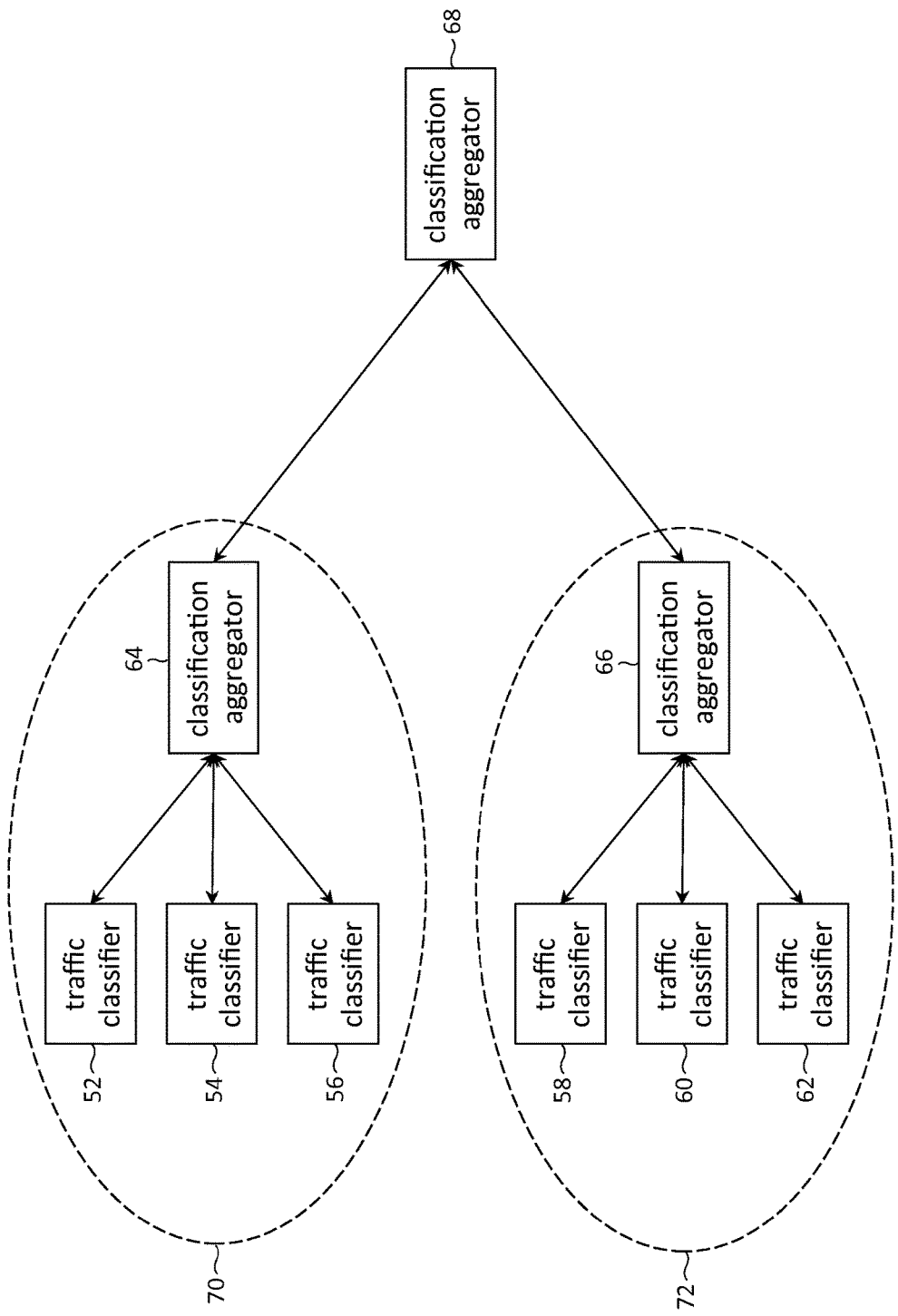
FIG. 3 depicts a system diagram with classification aggregators organized in a hierarchical manner, according to one embodiment of the invention.

FIG. 3 depicts a hierarchy of classification aggregators, according to one embodiment of the invention. In contrast to the system illustrated in FIG. 1, the system shown in FIG. 3 includes three classification aggregators 64, 66 and 68 (64 and 66 being subordinate to 68). A hierarchy of classification aggregators may be useful in system where the network traffic of multiple enterprises (or different divisions or groups of a single enterprise) is classified. In the present example, oval 70 designates a network belonging to one enterprise (hereinafter, "Enterprise A") and oval 72 designates a network belonging to another enterprise (hereinafter, "Enterprise B"). It is noted that network devices have not been depicted for ease of illustration, while it is understood that each traffic classifier depicted is still interposed between network devices, as previously described. The mappings created by Enterprise A may be useful for Enterprise B and vice versa, and these mappings may be shared by means of the hierarchy of classification aggregators. On the other hand, there may be mappings unique to Enterprise A that would never be useful for Enterprise B, and further, there may be mappings that Enterprise A does not desire to share with Enterprise B (for reasons of privacy, competition, etc.). In these cases, classification aggregator 64 may still collect these mappings and make these mappings accessible to traffic classifiers 52, 54 and 56 within Enterprise A. Further, classification aggregator 64 may choose not to share these mappings with classification aggregator 68, and accordingly these mappings are never made known to traffic classifiers 58, 60 and 62. In another embodiment, a subordinate classification aggregator may share (or may not share) classification information associated with a particular application class. For example, classification aggregator 64 may not share classification information associated with peer-to-peer applications. In one embodiment, one enterprise determines whether to share or not share one or more mappings with another enterprise based on rules configured by a network administrator.

Figure 4:
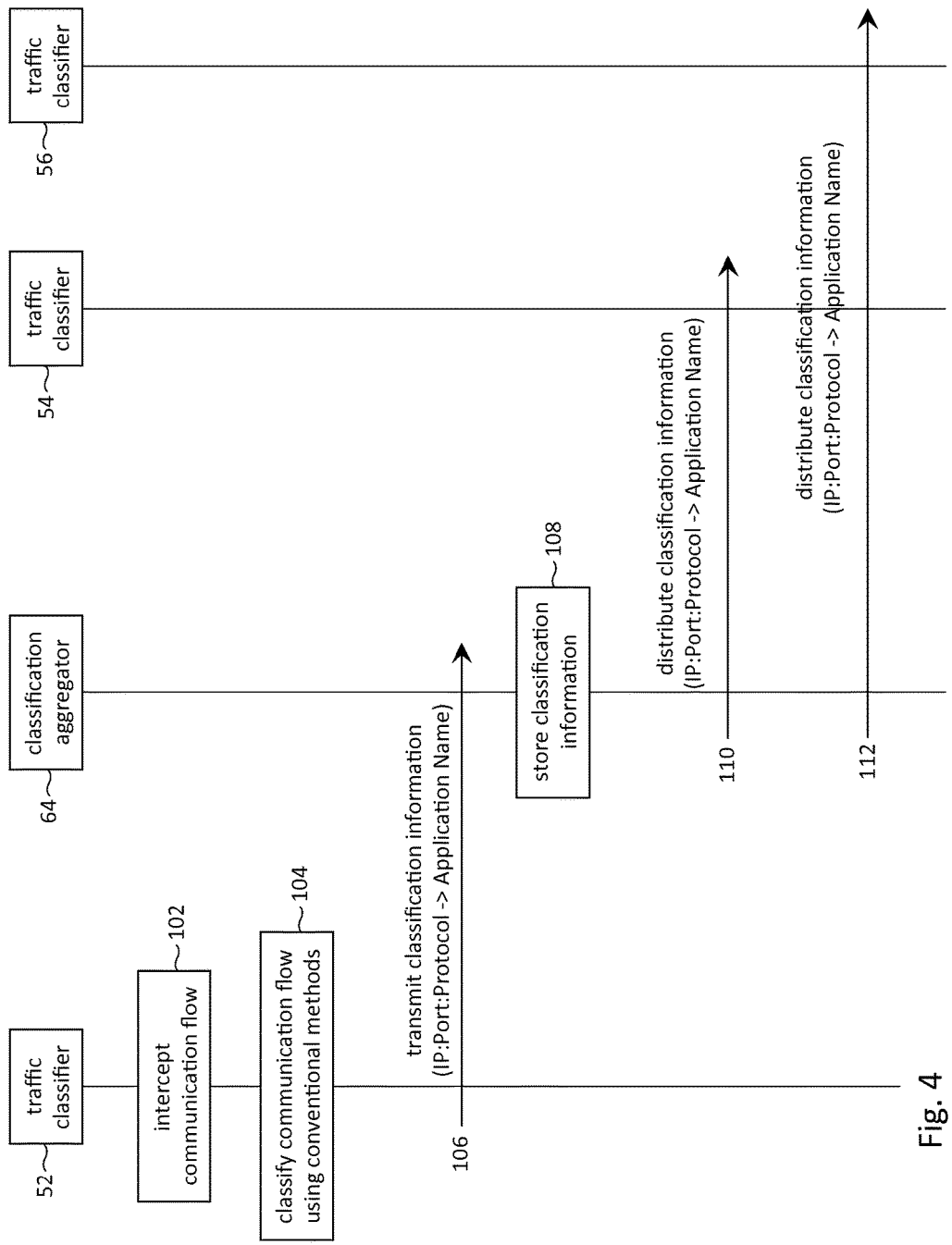
FIG. 4 depicts a process for aggregating and distributing classification information, according to one embodiment of the invention.
Figure 5:
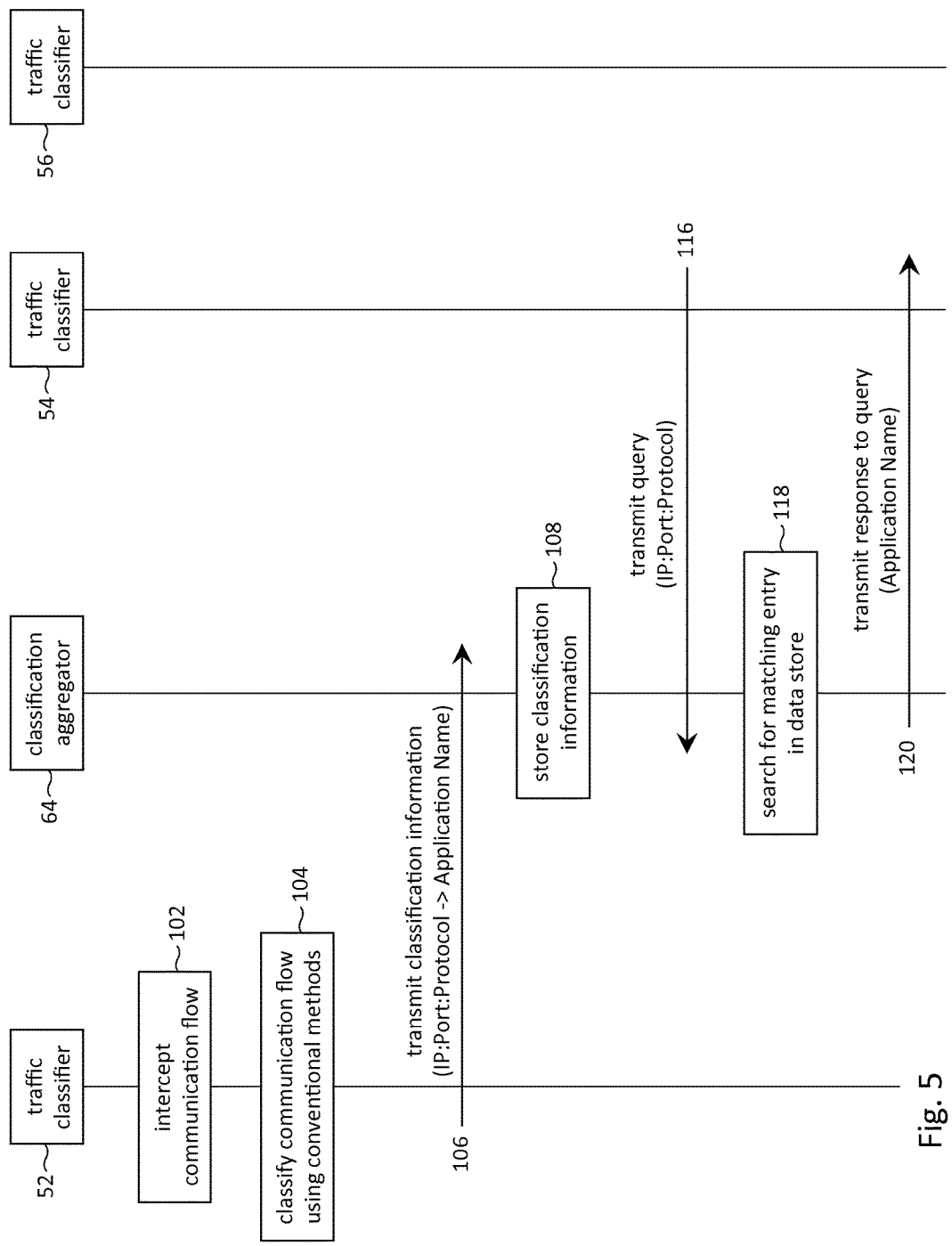
FIG. 5 depicts a process for aggregating and distributing classification information, according to another embodiment of the invention.
Figure 6:
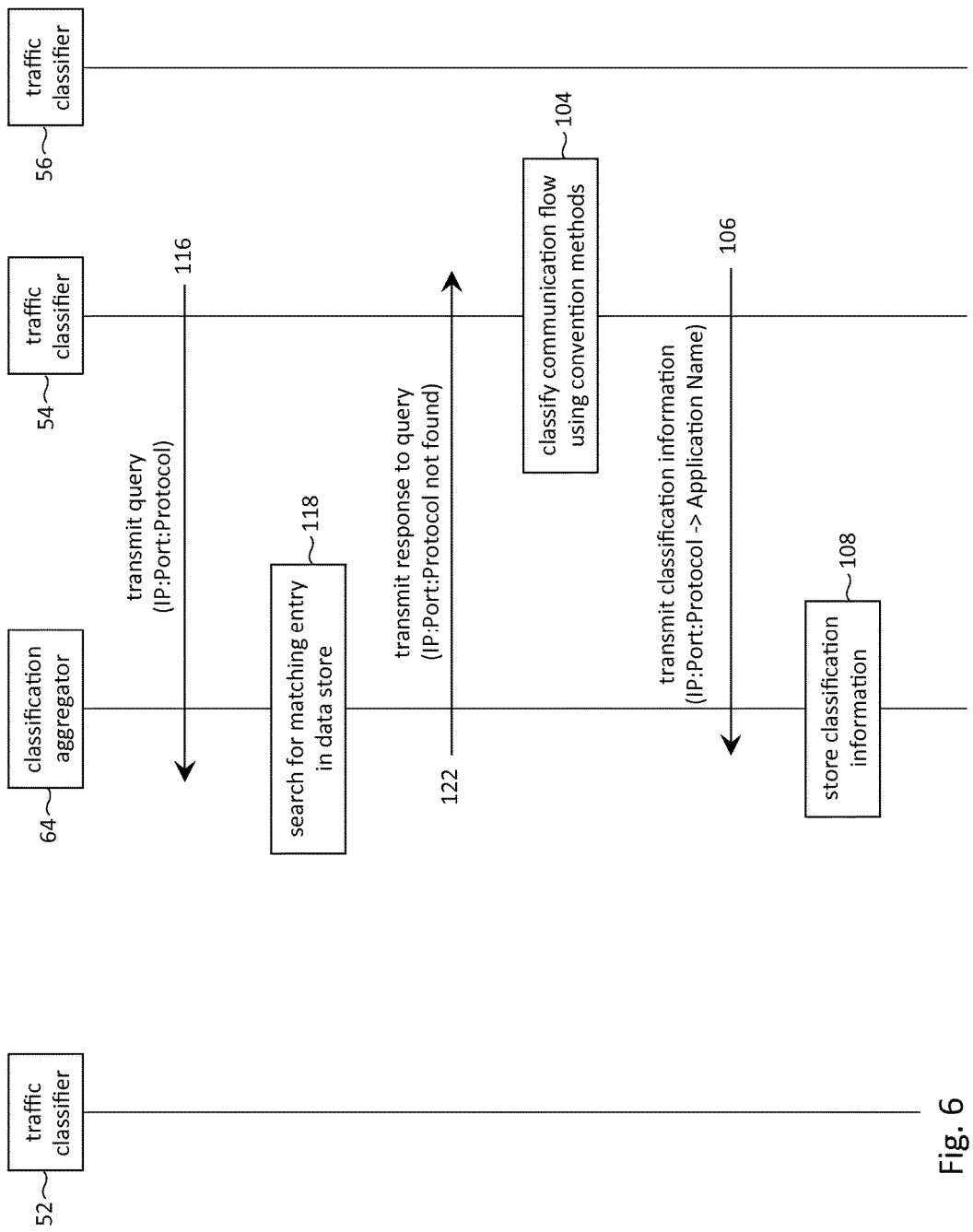
FIG. 6 depicts a process for aggregating and distributing classification information, according to yet another embodiment of the invention.

FIGS. 4, 5 and 6 depict certain processes associated with the aggregation, storage and distribution of classification information. FIG. 4 begins with traffic classifier 52 intercepting a communication flow (step 102), followed by traffic classifier 52 classifying the communication flow by application name (step 104) according to conventional methods. Classification may proceed according to conventional methods for a variety of reasons. For instance, no existing classification information (e.g., mappings) may be available to assist traffic classifier 52 with its classification. Even if classification information were available, it is possible that it is stale and cannot be used. At step 106, traffic classifier 52 may transmit abstracted classification information in the form of a mapping (e.g., (destination IP address=x, destination port number=y, protocol=z)->application name=w) to classification aggregator 64. At step 108, classification aggregator 64 may store the received mapping in a data store. The data store may include a plurality of entries, each entry including a mapping received from the traffic classifiers. While not depicted, steps 102, 104, 106 may be repeated by traffic classifier 52, and also may be performed by traffic classifiers 54 and 56, resulting in a large number of mappings being stored at classification aggregator 64. In steps 110 and 112, classification aggregator 64 distributes the mappings (all or a selection thereof) to traffic classifiers 54 and 56. The distributed mappings may refresh a local cache of mappings maintained at traffic classifiers 54 and 56.

FIG. 5 depicts an alternate embodiment in which traffic classifiers may access individual mappings stored at classification aggregator 64 via a query-based approach. Steps 102, 104, 106 and 108 proceed as in FIG. 4, and as a result of such steps, classification information is stored at classification aggregator 64. In step 116, traffic classifier 54 transmits a query to the classification aggregator 64. The query may include the destination IP address, destination port number and protocol of a communication flow intercepted by traffic classifier 54. Classification aggregator 64 may search through its data store (step 118) to determine whether or not the destination IP address, destination port number and protocol identified in the query correspond to that of any previously classified flow (e.g., any mapping present in the data store). If so, classification aggregator 64 transmits the corresponding application name to traffic classifier 54 (step 120).

FIG. 6 depicts an alternate scenario in which classification aggregator 64 searches through the data store (step 118), but fails to find a corresponding mapping. If this happens, classification aggregator 64 may inform traffic classifier 54 that the destination IP address, destination port number and protocol identified in the query were not found (step 122). As a result, the traffic classifier 54 may classify the intercepted communication flow using conventional methods (step 104). Upon classifying the intercepted communication flow, traffic classifier 54 may share the newly determined classification information (e.g., in the form of a mapping) with classification aggregator 64 (step 106). The classification aggregator 64 may store the newly determined mapping as an entry in its data store, if such entry does not already exist (step 108).

Figure 7:
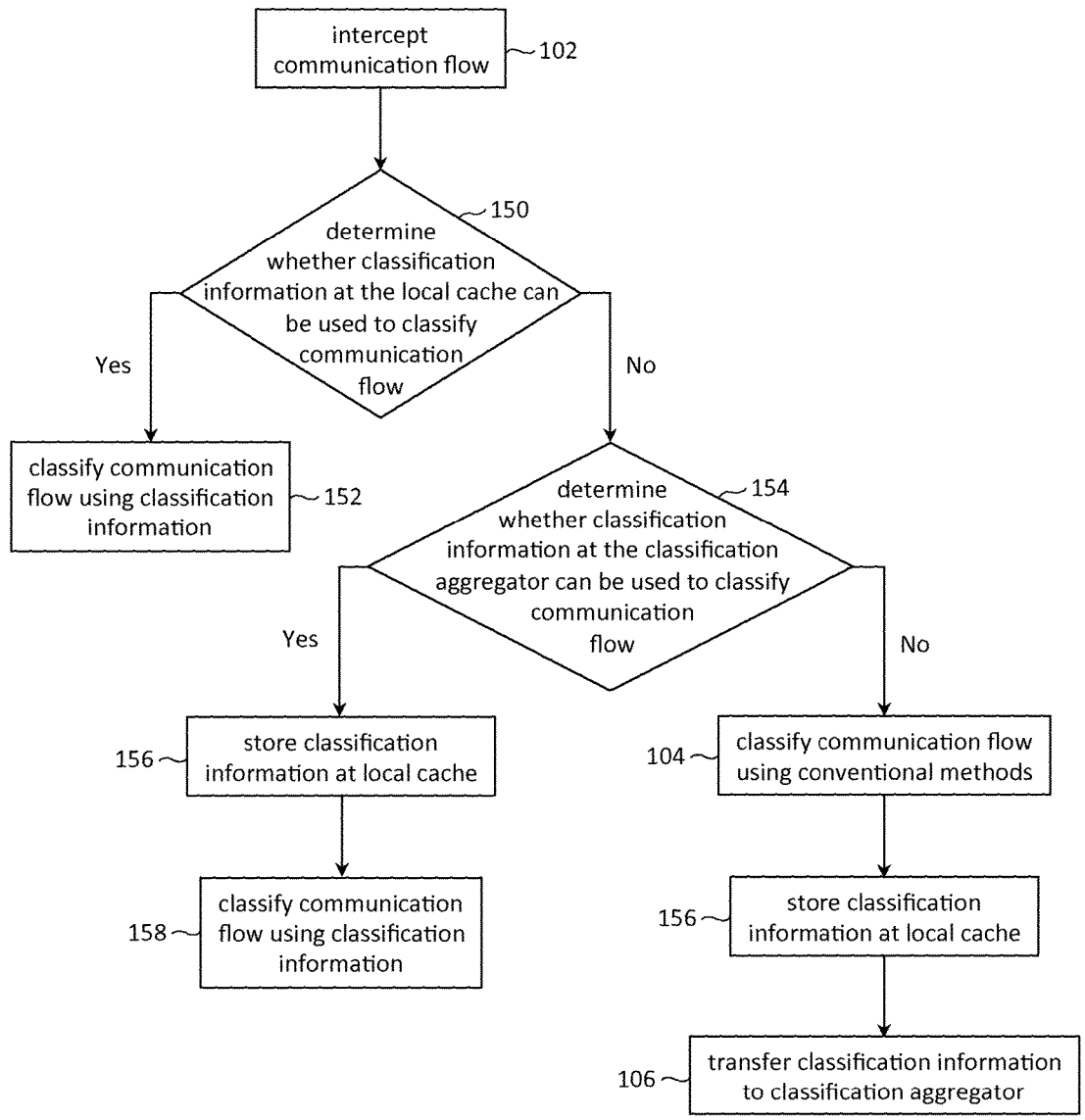
FIG. 7 depicts a flow chart describing a decision process governing whether an intercepted flow should be classified using classification information (e.g., mappings) or should be classified using conventional techniques, according to one embodiment of the invention.

FIG. 7 depicts a flow diagram which provides additional detail as to how a traffic classifier may determine whether an intercepted communication flow should be classified using existing classification information (e.g., mappings) or whether an intercepted communication flow should be classified by conventional methods. FIG. 7 shares certain steps of FIGS. 4-6, indicating that certain steps of FIGS. 4-6 can be understood as specific traversals through the flow diagram of FIG. 7.

At step 102, a traffic classifier intercepts a communication flow. At step 150, the traffic classifier may determine whether classification information (e.g., mappings) at a local cache (e.g., a cache local to the traffic classifier) can be used to classify the intercepted flow. A match in the destination IP address, destination port number and protocol of the intercepted flow and an entry in the local cache may indicate that classification information of the cache may be used to classify the intercepted flow. Upon finding a match, it may also be necessary to retrieve a TTL (time-to-live) parameter associated with the cached entry that indicates whether the cached entry is "still fresh" and can be used, or whether the entry is "stale" and cannot be used. If a match is found that is not stale, the intercepted flow is classified using classification information from the local cache (step 152).

If a match is not found, or if a match is found that is stale, the traffic classifier may determine whether classification information (e.g., mappings) at the classification aggregator can be used to classify the intercepted communication flow (step 154). A match in the destination IP address, destination port number and protocol of the intercepted flow and an entry in the classification aggregator may indicate that classification information of the classification aggregator may be used to classify the intercepted flow. If a match is found, classification information from the classification aggregator may be stored at the local cache (156) and further may be used to classify the intercepted communication flow (158).

If a match is not found, the intercepted flow may be classified using conventional methods (step 104). The classification of the intercepted flow may be abstracted into classification information (e.g., mappings), which may be stored at a local cache (step 156) and may further be shared with the classification aggregator (106). As previously described, such sharing of classification information with the classification aggregator may be performed periodically or immediately after the classification information is generated.

Figure 8:
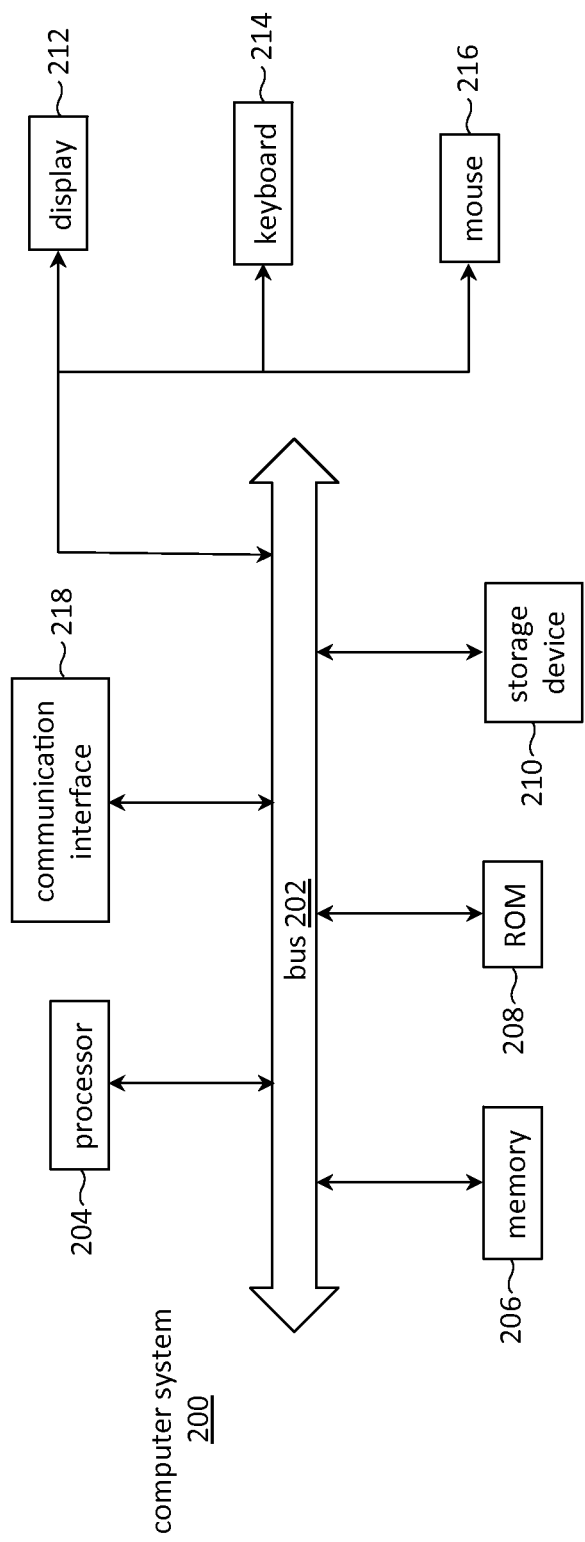
FIG. 8 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 8 provides an example of a computer system 200 that is representative of any of the network devices, traffic classifiers and classification aggregators discussed herein. Note, not all of the various computer systems may have all of the features of computer system 200. For example, certain of the computer systems discussed above may not include a display inasmuch as the display function may be provided by a client computer communicatively coupled to the computer system or a display function may be unnecessary. Such details are not critical to the present invention.

Computer system 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 204 can read, is provided and coupled to the bus 202 for storing information and instructions (e.g., operating systems, applications programs and the like).

Computer system 200 may be coupled via the bus 202 to a display 212, such as a flat panel display, for displaying information to a computer user. An input device 214, such as a keyboard including alphanumeric and other keys, is coupled to the bus 202 for communicating information and command selections to the processor 204. Another type of user input device is cursor control device 216, such as a mouse, a trackball, or cursor direction keys for communicating direction information and command selections to processor 204 and for controlling cursor movement on the display 212. Other user interface devices, such as microphones, speakers, etc. are not shown in detail but may be involved with the receipt of user input and/or presentation of output.

The processes referred to herein may be implemented by processor 204 executing appropriate sequences of computer-readable instructions contained in main memory 206. Such instructions may be read into main memory 206 from another computer-readable medium, such as storage device 210, and execution of the sequences of instructions contained in the main memory 206 causes the processor 204 to perform the associated actions. In alternative embodiments, hard-wired circuitry or firmware-controlled processing units (e.g., field programmable gate arrays) may be used in place of or in combination with processor 204 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 200 or similar electronic computing device, that manipulates and transforms data represented as physical (electronic) quantities within its registers and memories into other data similarly represented as physical quantities within its memories or registers or other such information storage, transmission or display devices.

Computer system 200 also includes a communication interface 218 coupled to the bus 202. Communication interface 218 provides a two-way data communication channel with a computer network, which provides connectivity to and among the various computer systems discussed above. For example, communication interface 218 may be a local area network (LAN) card to provide a data communication connection to a compatible LAN, which itself is communicatively coupled to the Internet through one or more Internet service provider networks. The precise details of such communication paths are not critical to the present invention. What is important is that computer system 200 can send and receive messages and data through the communication interface 218 and in that way communicate with hosts accessible via the Internet.

The various databases described herein are computer-based record keeping systems. Stated differently, these databases are each a combination of computer hardware and software that act together to allow for the storage and retrieval of information (data). Accordingly, they may resemble computer system 200, and are often characterized by having storage mediums capable of accommodating significant amounts of information.

Thus, methods, devices and computer-readable media for performing collaborative application classification have been described. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for performing collaborative application classification in a system including a classification aggregator communicatively coupled to a plurality of traffic classifiers, the plurality of traffic classifiers including a first and second traffic classifier, the method comprising:

receiving, at the classification aggregator, classification information from the first traffic classifier, the classification information including a destination Internet protocol (IP) address, a destination port number, a protocol and a first application name associated with a first communication flow classified by the first traffic classifier;

storing the classification information in a data store of the classification aggregator, the data store containing multiple entries, each of the entries mapping a group of characteristics, including a destination IP address, a destination port number and a protocol, to a corresponding application name;

receiving, at the classification aggregator, a query requesting an application name associated with a second communication flow from a second classifier; and providing the first application name, in response to determining that the second communication flow is associated with the first application name, to the second classifier, wherein determining that the second communication flow is associated with the first application name is based on one or more of the entries of the data store of the classification aggregator.

2. The method of claim 1, wherein the classification information is periodically received from the first traffic classifier.

3. The method of claim 1, wherein the classification information is received at the classification aggregator each time the first traffic classifier generates new classification information.

4. The method of claim 1, wherein the first traffic classifier classifies a third communication flow and classification information associated with the third communication flow is stored at the classification aggregator only if the first traffic classifier permits the classification information associated with the third communication flow to be stored at the classification aggregator.

5. The method of claim 4, wherein a decision of whether classification information associated with the third communication flow is to be stored at the classification aggregator is based on rules configured by a network administrator.

6. The method of claim 1, further comprising deleting an entry of the data store if, during a period of time, no traffic classifier accesses that entry.

7. The method of claim 1, wherein the query received from the second traffic classifier comprises characteristics of the second communication flow.

8. The method of claim 7, wherein the characteristics included in the query include a destination IP address, a destination port number and a protocol of the second communication flow.

9. The method of claim 1, wherein the classification aggregator further provides one or more of:
a security risk associated with the first application; and
suggested policy information for the first application.

10. The method of claim 9, wherein the suggested policy information for the first application specifies one or more of admission control, traffic prioritization and bandwidth allocation for the first application.

11. The method of claim 1, wherein the classification aggregator further provides one or more of a security risk associated with a host associated with the second communication flow and suggested policy information for the host.

12. The method of claim 11, wherein the suggested policy information for the host specifies one or more of admission control, traffic prioritization and bandwidth allocation for the host.

13. The method of claim 1, wherein a collection of classification information is maintained in a cache of each of the plurality of traffic classifiers, and the collection of classification information is periodically refreshed by the classification aggregator.

14. The method of claim 1, wherein the entries in the data store include a first entry, and the classification aggregator distributes the first entry to one or more of the plurality of traffic classifiers if a number of the plurality of traffic classifiers that accessed the first entry is greater than a threshold.

15. The method of claim 1, wherein the entries in the data store include a first entry, and the classification aggregator distributes the first entry to one or more of the plurality of traffic classifiers if a percentage of the plurality of traffic classifiers that accessed the first entry is greater than a threshold.

16. The method of claim 1, wherein the entries in the data store include a first entry, and the classification aggregator distributes the first entry to one or more of the plurality of traffic classifiers if a number of times the first entry was accessed is greater than a threshold.

17. The method of claim 1, wherein the entries in the data store include a first entry, and the classification aggregator distributes the first entry to one or more of the plurality of traffic classifiers if the first entry is associated with a peer-to-peer application.

18. The method of claim 1, further comprising updating the entry corresponding to the first application name with classification information from the second classifier.

19. The method of claim 1, further comprising processing the classification information stored in the data store of the classification aggregator, wherein processing the classification information comprises one of:
deleting one or more entries;
grouping one or more entries;
combining one or more entries; and
modifying one or more entries.

20. A classification aggregator device, comprising:
a processor;
a storage device connected to the processor; and
a set of instructions on the storage device that, when executed by the processor, cause the processor to:
receive classification information from a first traffic classifier, the classification information including a destination Internet protocol (IP) address, a destination port number, a protocol and a first application name associated with a first communication flow classified by the first traffic classifier;
store the classification information in the storage device, the storage device containing multiple entries, each of the entries mapping a group of characteristics, including a destination IP address, a destination port number and a protocol, to a corresponding application name;
receive a query requesting an application name associated with a second communication flow from a second classifier; and
provide the first application name, in response to determining that the second communication flow is associated with the first application name, to the second classifier, wherein determining that the second communication flow is associated with the first application name is based on one or more of the entries of the data store of the storage device.

21. A non-transitory machine-readable storage medium comprising software instructions that, when executed by a processor, cause the processor to:
receive classification information from a first traffic classifier, the classification information including a destination Internet protocol (IP) address, a destination port number, a protocol and a first application name associated with a first communication flow classified by the first traffic classifier;
store the classification information in a storage device, the storage device containing multiple entries, each of the entries mapping a group of characteristics, including a destination IP address, a destination port number and a protocol, to a corresponding application name;
receive a query requesting an application name associated with a second communication flow from a second classifier; and
provide the first application name, in response to determining that the second communication flow is associated with the first application name, to the second classifier, wherein determining that the second communication flow is associated with the first application name is based on one or more of the entries of the data store of the storage device.

22. The classification aggregator device of claim 21, further comprising instructions that, when executed by the processor, cause the processor to update the entry corresponding to the first application name with classification information from the second classifier.

23. A method for performing collaborative application classification in a system including a hierarchy of classification aggregators, the hierarchy of classification aggregators including a first classification aggregator communicatively coupled to a second and third classification aggregator, the second classification aggregator further coupled to a first and second traffic classifier, and the third classification aggregator further coupled to a third and fourth traffic classifier, the method comprising: receiving, at the second classification aggregator, classification information from the first traffic classifier, the classification information including a destination Internet protocol (IP) address, a destination port number, a protocol and an application name associated with a first communication flow classified by the first traffic classifier; storing the classification information in a data store of the second classification aggregator, the data store of the second classification aggregator containing multiple entries, each of the entries mapping a group of characteristics, including a destination IP address, a destination port number and a protocol, to a corresponding application name; in response to determining to transmit the classification information from the second classification aggregator to the first classification aggregator, providing the classification information to the first classification aggregator; receiving, at the first classification aggregator, a query requesting an application name associated with a second communication flow from the third classification aggregator; and providing the first application name, in response to determining that the second communication flow is associated with the first application name, to the third classification aggregator, wherein determining that the second communication flow is associated with the first application name is based on the classification information provided to the first classification aggregator.

24. The method of claim 23, wherein the second classification aggregator determines whether or not to transmit the classification information to the first classification aggregator based on rules configured by a network administrator.

25. The method of claim 23, further comprising transmitting the classification information from the second classification aggregator to the first classification aggregator.

26. The method of claim 25, further comprising transmitting the classification information from the first classification aggregator to the third classification aggregator.

27. The method of claim 26, further comprising transmitting the classification information from the third classification aggregator to the third and fourth traffic classifiers.

28. The non-transitory machine-readable storage medium of claim 23, further comprising instructions that, when executed by a processor, cause the processor to update the entry corresponding to the first application name with classification information from the second classifier.

\* \* \* \* \*